United States Patent [19]
Geihl

[11] 3,889,432
[45] June 17, 1975

[54] FOLDABLE MODULAR SHELTER UNIT REMOVABLY SECURED TO A VEHICLE

[76] Inventor: Jerry L. Geihl, 4606 Cedar Springs Rd., Dallas, Tex. 75219

[22] Filed: Dec. 26, 1973

[21] Appl. No.: 427,444

Related U.S. Application Data

[62] Division of Ser. No. 283,829, Aug. 25, 1972, Pat. No. 3,827,198.

[52] U.S. Cl. .................................. 52/69; 52/67; 52/71; 214/77 R; 296/23 MC; 52/143
[51] Int. Cl. ............................ E04h 1/12; B60p 3/34
[58] Field of Search ..... 214/77 R, 514; 296/23 MC, 296/26, 27; 52/70, 71, 69, 143

[56] References Cited
UNITED STATES PATENTS

| | | | |
|---|---|---|---|
| 2,395,691 | 2/1946 | Smith | 52/71 X |
| 2,493,236 | 1/1950 | Dunstan | 296/26 |
| 2,904,849 | 9/1959 | Bergstrom | 296/33 MC |
| 2,907,077 | 10/1959 | Pugsley | 52/143 X |
| 2,909,296 | 10/1959 | Keys | 214/77 R |
| 2,982,431 | 5/1961 | Moody | 214/77 R |
| 3,169,792 | 2/1965 | Viquez | 296/26 X |
| 3,174,630 | 3/1965 | Tantlinger et al | 214/77 R |
| 3,257,760 | 6/1966 | Calthorpe | 52/71 X |
| 3,408,102 | 10/1968 | McNamee | 52/69 X |
| 3,458,232 | 7/1969 | Frank | 296/27 |
| 3,484,003 | 12/1969 | Strandberg et al | 214/77 R |
| 3,515,295 | 6/1970 | Klaus | 214/77 R |

FOREIGN PATENTS OR APPLICATIONS

| | | | |
|---|---|---|---|
| 1,302,513 | 7/1962 | France | 296/26 |
| 1,299,726 | 6/1962 | France | 296/26 |
| 1,239,929 | 7/1960 | France | 296/26 |

*Primary Examiner*—Frank L. Abbott
*Assistant Examiner*—Leslie A. Braun
*Attorney, Agent, or Firm*—Clegg, Cantrell & Crisman

[57] ABSTRACT

There are disclosed two forms of foldable and expandable portable shelter modules having back or fixed wall units to which floor, roof and wall sections are hingedly or slidably attached to provide compact traveling packages and commodious shelters. The modules may be combined with each other and/or with trailers or automotive vehicles for use in a variety of applications.

6 Claims, 16 Drawing Figures

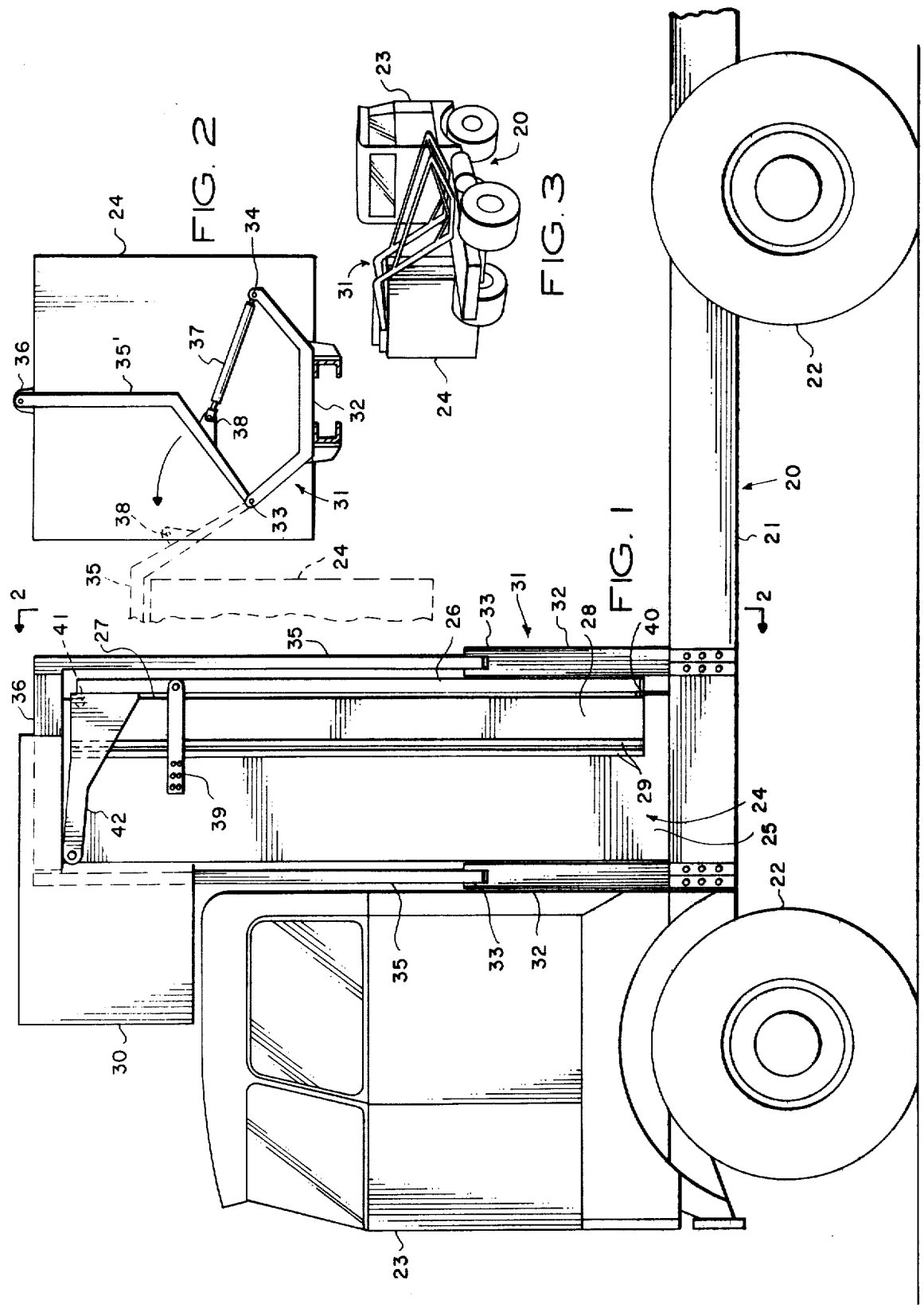

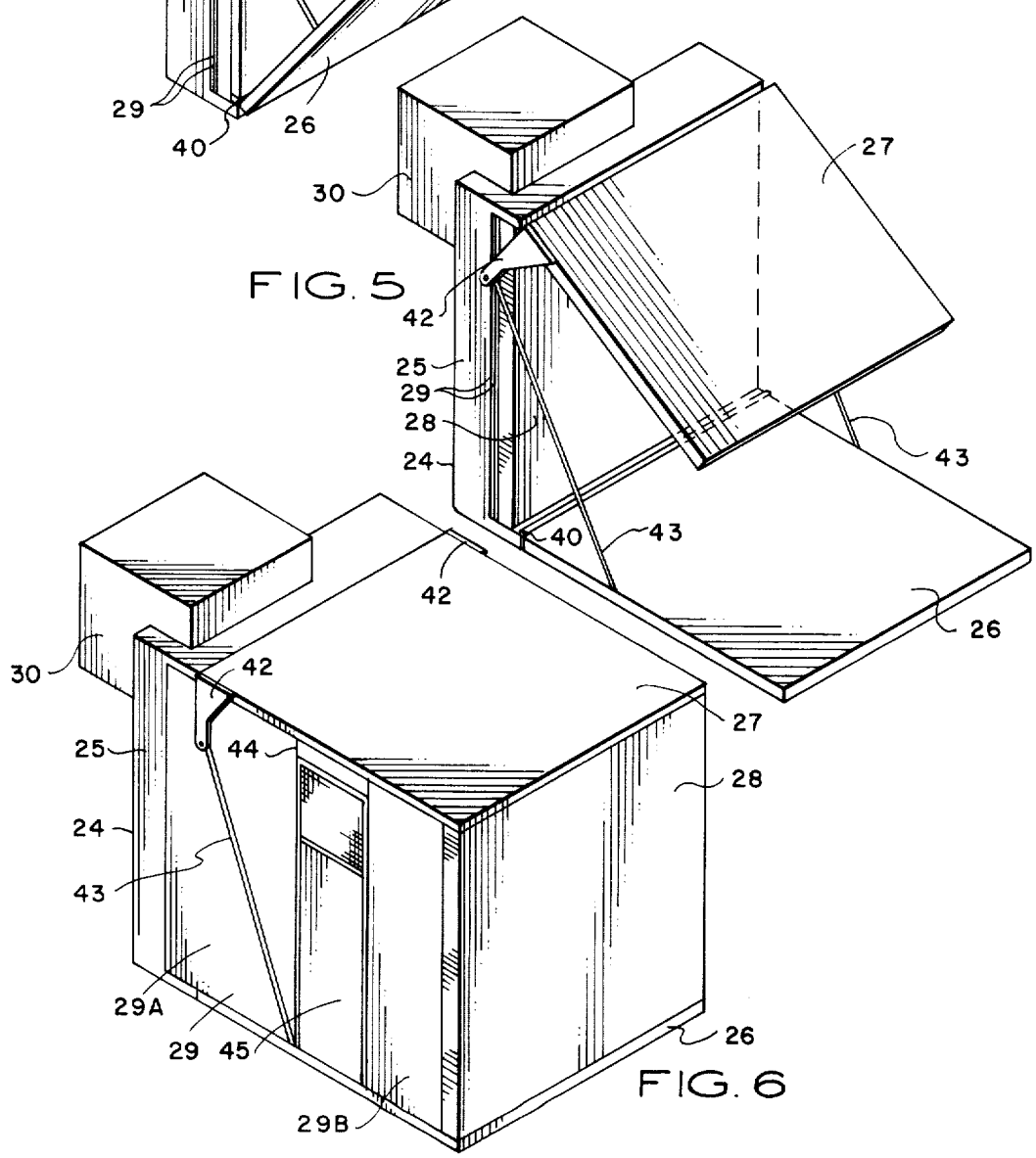

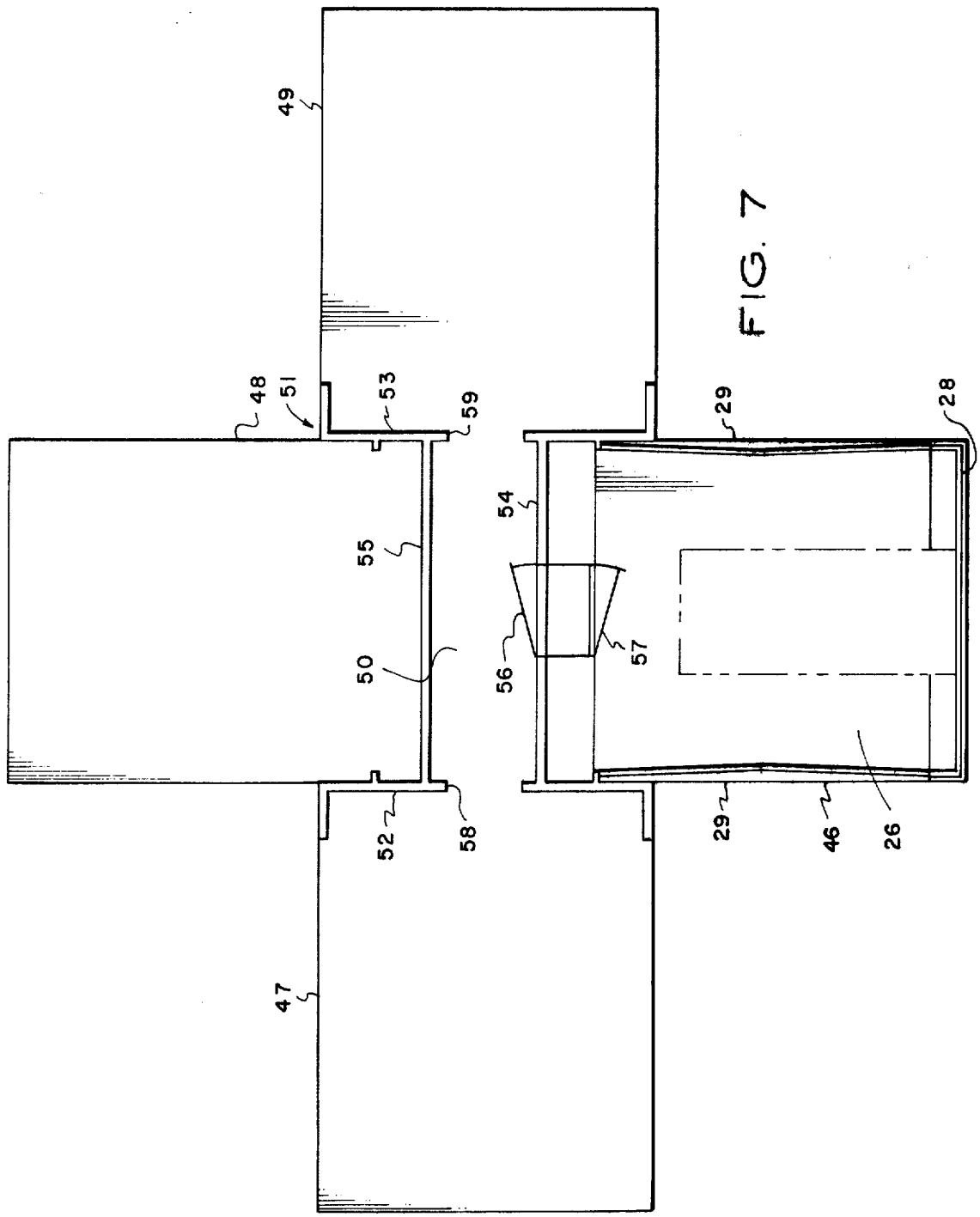

FOLDABLE MODULAR SHELTER UNIT REMOVABLY SECURED TO A VEHICLE

REFERENCE TO COPENDING APPLICATIONS

This application is a division of application Ser. No. 283,829, filed Aug. 25, 1972, now U.S. Pat. No. 3,827,198.

BACKGROUND OF THE INVENTION

This invention relates to modular shelter units, and particularly to modular shelter units of the type which are constructed and arranged to occupy a compact, small space when packed for storage or transport and which unfold or expand to provide a materially larger, and commodious, shelter unit when in use.

Portable shelters have been proposed and constructed in wide variety of forms, ranging from simple tents to elaborate house trailers, mobile homes, and motor homes. Some of these have been completely or in part collapsible or foldable so that they occupy less space when packed for storage or transport than when in use as shelters, but in general, the packing or folding arrangements have been such that an inconvenient, if not inordinate, amount of time, and a considerable level of manual skill, is necessary to operate them.

One application of portable shelters which is presently in a rudimentary state of development, is that of shelters for truck drivers. The most widely employed conventional solution to providing economical and private sleeping facilities for over-the-road tractor trailer drivers is the "sleeper cab," an extension of the tractor cab rearwardly of the driver's seat to provide a space for a transverse bunk and for storage beneath it. While the sleeper cab provides practically no amenities, it is an expensive solution to the problem, involving conventional truck cab body work.

Another field of portable shelter application which is poorly served by equipment available in the present state of the art is that of mass housing of personnel who must move from location to location at short intervals. Such situations occur in the case of army units, especially in arctic and subarctic locations, pipeline construction crews, oil well crews, wilderness road construction crews, and the like.

SUMMARY OF THE INVENTION

In accordance with the present invention, there is provided a basic folding and expanding shelter module which is capable, in accordance with other aspects of the invention, of being combined with itself and with a wide variety of other equipment to provide improved portable shelter in a number of situations in which such shelter is desirable if not essential.

The basic module of the invention comprises generally an upright back or fixed wall unit, to which, in the preferred embodiment, are hingedly mounted a roof section, a floor section, and accordion side sections, to which, in turn, a front wall section is hingedly mounted. In the stowed condition, the accordion side wall sections are folded inwardly against the back or fixed wall unit, with the front wall thus drawn up against them and thus also against the back or fixed wall unit as a consequence; the roof section is folded down against the front wall section and thus also against the back or fixed wall unit; and the floor section is folded up against the roof section and thus also against the back or fixed wall unit. Thus the basic module, in stowed condition, forms a compact prismatic package with width and height dimensions substantially equal to the width and height of the back or fixed wall unit, and with a depth or thickness not much thicker than that of the back or fixed wall unit. In use condition, the floor section is swung outwardly and downwardly from the back or fixed wall unit, the roof section is swung outwardly and upwardly from the back or fixed wall unit, the accordion side walls are swung outwardly from the back or fixed wall unit to displace the front wall section to the outer edges of the roof and floor sections, and the sections are then locked to one another to form a stable prismatic room. The term "fixed" as used herein to describe the back wall unit is meant to characterize it relative to the other sections of the basic module, and not to connote that it is stationary, since in fact the entire basic module is portable and is movable with respect to other equipment of the invention in some embodiments as will appear more fully herein below.

As will appear from the detailed description of the invention hereinbelow, the basic module just described, when combined with other equipment produces apparatus having utility in a wide variety of applications. Thus, when it is combined with a tractor frame and raising and lowering equipment, it forms commodious over-night accommodations for over-the-road truck operators. When combined with a trailer frame of the kind designed to carry a removable load, such as a boat, it provides a shelter which can be used when the trailer load is removed, but which does not interfere with the primary function of the trailer, that of hauling the removable load. When it is combined with a box trailer, such as a horse trailer or a travel trailer, it provides a shelter unit with additional accommodations without materially increasing the size of the box trailer in its traveling position. Furthermore, two or more modules may be combined into a single package to provide a multi-room shelter unit for a variety of purposes with a very compact traveling package.

Another form of the module of the present invention comprises generally a prismatic base unit having a floor, roof, back wall and side walls, into which is telescoped a prismatic expansion unit, having a front wall, floor, roof and side walls. This form of the invention also provides the advantages of a compact traveling package which expands to provide commodious shelter facilities and, like the module discussed hereinabove, it can be combined with other equipment for many applications.

From the foregoing, it can be seen that it is a principal object of the present invention to provide improved apparatus of the modular shelter type which is compact when packed for storage or transport and which is commodious when expanded or unfolded for use as a shelter unit.

It is a further object of the present invention to improve various types of transportation equipment such as tractor trailers and trailers to provide them with a capability of acting as shelters, without materially increasing their size or detracting from their transportation function.

The foregoing objects, together with other objects, may be more readily understood from the detailed description which follows, together with the accompanying drawings.

DESCRIPTION OF THE DRAWINGS

FIG. 1 is a side elevational view, somewhat diagramatic, of a truck tractor constructed in accordance with the invention, showing the basic module of the invention in its packed or stowed condition;

FIG. 2 is a simplified sectional view taken along the line 2—2 of FIG. 1, the view being drawn on a reduced scale;

FIG. 3 is a rear isometric view, on a still further reduced scale, of the truck tractor and shelter unit of FIGS. 1 and 2, showing the shelter module displaced and disposed onto the ground for unfolding, but still in its packed condition;

FIGS. 4, 5 and 6 are a series of isometric views of the basic module of the preferred form of the invention showing, when considered in numerical order, stages in the unpacking of the basic module to form an expanded shelter unit, and when considered in the reverse order, successive stages in the folding for storage and transport of the shelter unit.

FIG. 7 is a simplified plan view of a multi-room shelter comprised of four of the basic modules of the invention connected to one another to form a single transport package;

DESCRIPTION OF THE PREFERRED EMBODIMENT

Figure 8:
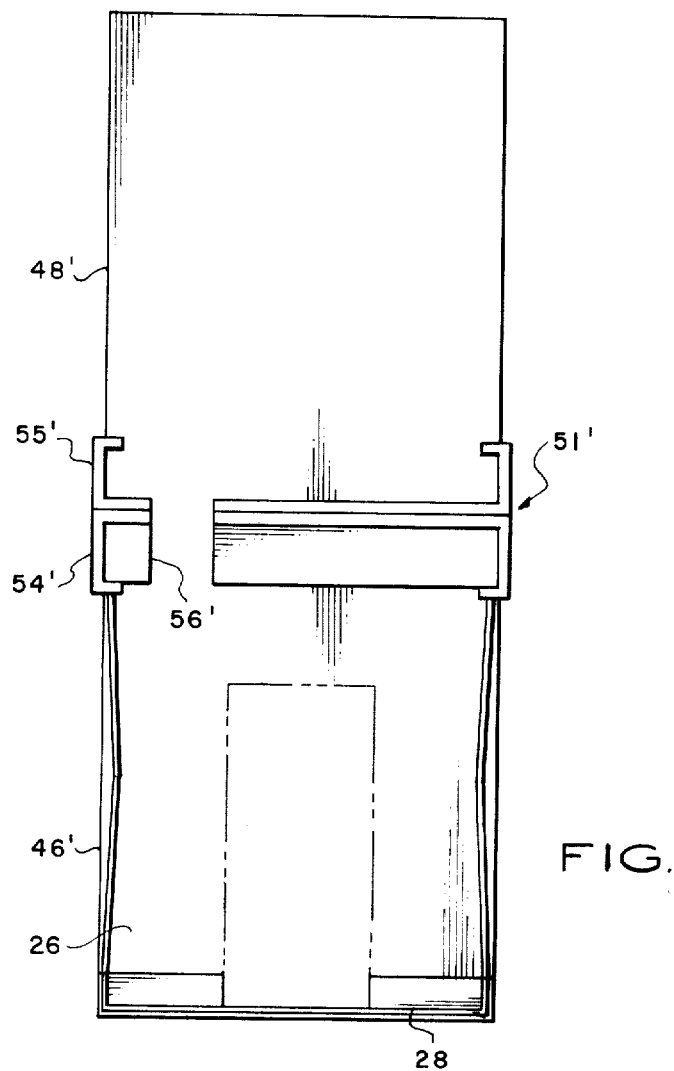
FIG. 8 is a simplified plan view of another multi-room shelter comprised of two of the basic modules of the invention connected to each other to form a single transport package.

The embodiment of the invention shown in FIG. 1 includes a conventional over-the-road truck tractor designated generally as 20, having a frame 21, wheels 22, and an over-the-engine type cab 23. A fifth wheel (not shown) is mounted on the rear part of frame 21 for attachment to a semi-trailer of conventional variety. Mounted on frame 21, in a manner to be described, is a basic module designated generally as 24. It is shown in FIG. 1 in its packed position for traveling, and as can be seen in that figure, it does not extend lengthwise of the tractor a distance materially greater than the length of a sleeper cab similarly located. The module 24 includes a generally upright back wall unit 25, a floor unit 26, a roof unit 27, a front wall unit 28, only the edge portions of which can be seen in FIG. 1, and side wall units 29, which also appear in edge view as FIG. 1 is drawn. Back wall unit 25 desirably includes a forwardly extending housing 30 to accommodate air conditioning equipment.

Module 24 is mounted on the frame 21 of the tractor by means of a lifting lever system designated generally as 31. The construction and operation of the lifting levers can best be understood by considering FIGS. 2 and 3, from which it can be seen that a pair of transverse bars 32 are attached to frame 21, one in front of and one behind module 24. Pivot points 33 and 34 are provided at the ends of the bars 32. A pair of lifting levers 35 are pivotally attached at points 33 to the transverse bars 32. The upper ends of levers 35 are pivotally mounted to the top of back wall unit 25 by a shaft passing through tube 36 which is affixed to the top of the back wall unit. A pneumatic or hydraulic cylinder and piston unit 37 is pivotally attached to each transverse bar 32 at pivot point 34, and is also pivotally attached to lifting lever 35 at the point 38. The cylinder and piston units 37 may conveniently be powered by the air brake system of the tractor unit 20 or other suitable means.

The portion of FIG. 2 drawn in full lines shows the foregoing equipment in its position for travel, while the portion shown in dotted outline shows the equipment after the lifting lever system has been actuated to place the module 24 on the ground next to the truck. The latter condition is also illustrated pictorially in FIG. 3. When the piston of cylinder unit 37 is displaced fully into the cylinder of the unit, the module 24 is located on the truck frame. When the piston is displaced outwardly in its cylinder, the lever system swings the module off of the frame of the truck onto the ground next to the truck.

As can be seen on FIG. 1, a latch bar 39 is provided for locking the floor unit 26 to the back wall unit 25 in the stowed position. FIG. 1 also shows that floor unit 26 is hingedly connected to the back wall unit 25 at pivot 40, while roof unit 27 is hingedly connected to the back wall unit 24 at pivot 41. As will be explained in more detail with respect to FIGS. 4–6, a bar 42 is fitted to the top of each end of the roof unit to facilitate moving it during unfolding and folding operations.

Attention is not directed to FIGS. 4–6, which are isometric views showing successive stages in the unfolding of a basic module. Attached to floor member 26 at each edge thereof are springs 43. The other ends of springs 43 are attached to the end of bar 42 mentioned above. FIG. 4 shows floor unit 26 in the process of being lowered by being pivoted about point 40 downwardly and away from the back wall unit 25. As the floor is lowered, the tension in springs 43 is increased. Stated differently, the work contributed by gravity in the course of the pivotal lowering of floor unit 26 is stored in part as spring energy in springs 43.

FIG. 5 shows the floor unit in its fully lowered position, and shows the roof unit being pivotally raised away from the back wall unit. The energy stored in springs 43 is expended in assisting the person opening the unit to raise the roof unit into position, by applying a pivoting force through bar 42. In this manner, the amount of effort which need be supplied by the person erecting the module is decreased.

Roof unit 27 is shown in its uppermost position in FIG. 6. FIG. 6 also shows the front wall unit as being pulled laterally outwardly from back wall unit 25 to the outermost edges of roof unit 27 and floor unit 26, where it is latched in position. As the front wall unit is moved to its outermost position, accordion walls 29, each formed of inner member 29A and outer member 29B, which are hinged together along line 44, unfold into aligned position to form a unified pair of side walls which are latched to the floor unit 26 and roof unit 27.

From the description thus far it can be seen that the back wall unit 25 of the basic module 24 is relatively thick compared to the thickness of the floor unit 26, the roof unit 27, the front wall unit 28, and the side wall units 29. While the thickness of back wall unit 25 may be varied according to the particular application to which the module is to be put, it is of considerable advantage in accordance with the invention to have it of moderate thickness, for example, on the order of one and a half to two feet. When such is the case, the internal volume of the back wall unit, even when the module is in its stowed or packed configuration, can be used to accommodate various pieces of equipment including utility equipment. For example, in the tractor trailer application of the invention described in references with FIGS. 1-3, the interior of the back wall unit 25 may conveniently contain cabinets, utility equipment such as a water tank, a toilet, a folding shower, cooking equipment, and the like. For applications in which it is not desirable or necessary to include equipment of this kind, the back wall unit 25 may be made commensurately thinner.

As can best be seen in FIG. 6, a door 45 is desirably formed in side wall 29, and in particular in the outer member 29B of the side wall. While door 45 may be variously positioned, when the module is employed in connection with a tractor trailer, as illustrated in FIGS. 1-3, it is most conveniently located in a side wall which is outboard of the tractor trailer when the module is positioned on the ground. If desired, door 45 may be positioned in front wall 28 or in the back wall of back wall unit 25.

In many applications of the basic module 24, its weight will be a factor of considerable importance, and for this reason the various wall units are desirably constructed of aluminum or steel channel stock, covered with aluminum sheet on the exterior and aluminum or plastic sheet on the interior, with the internal spaces filled with lightweight foamed plastic to provide thermal insulation, sound proofing, and additional structural rigidity. Such a form of construction is both lightweight and strong.

The hinge points between the various sections of the basic module are desirably of the piano hinge type for good load distribution and weather tightness. Conventional weather stripping may be provided at appropriate locations to increase the weather tightness of the module in its expanded condition. Latches are provided at convenient locations to lock the wall, floor, roof, and side units together; various conventional types of latches may be employed.

Attention is now directed to FIG. 7, which illustrates in simplified plan view a multi-room shelter constructed from four basic modules of the kind hereinbefore described. In FIG. 7 the four modules are designated 46, 47, 48, and 49, with the latter three modules being shown only in plan outline. As can be seen from a consideration of module 46, it includes accordion side walls 29, front wall unit 28, floor unit 26, and although not appearing on the drawing, roof unit 27.

Modules 46 and 48 are arranged generally back to back and modules 47 and 49 are also arranged generally back to back. Modules 47 and 49 are spaced from each other by distance substantially equal to the width of modules 46 and 48, while modules 46 and 48 are spaced from each other by a distance such that when modules 46 and 48 are folded into their packed configuration, the front walls thereof are substantially flush with the sides of the back wall units of modules 47 and 49. Such a spacing produces a hallway 50 internally of the multi-room shelter. Such spacing also produces a folded package which is generally prismatic in shape, and which may be conveniently carried in a truck, aircraft, or on a trailer.

As can be seen from FIG. 7, the back wall units of the modules 46, 47, 48 and 49 are combined into a unitary structure designated generally as 51, in which the back walls of modules 47 and 49 (which walls are designated as 52 and 53, respectively) also function as the sides of the back wall units of modules 46 and 48. The back wall units of modules 46 and 48, designated 54 and 55 respectively, define the interior hallway 50. Doors, such as illustrated at 56 and 57, as well as doorways as indicated at 58 and 59 may be provided to afford communication between the modules by way of the hallway 50.

The particular multi-room shelter of the invention illustrated in FIG. 7 may be put to a variety of uses, but it is particularly well suited for use as a mobile surgical hospital such as would be needed for battlefield use. Thus, one module, for example 46, may be employed as an operating room, while module 47 may be used as a receiving room, module 48 as a laboratory, and module 49 as a recovery room.

Figure 9:
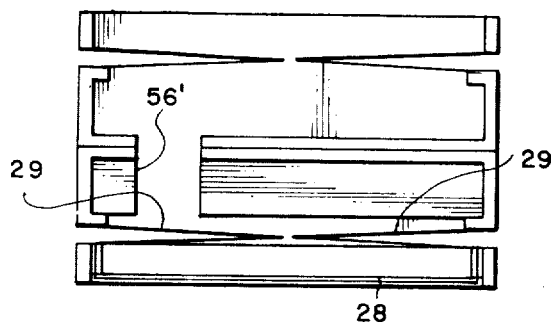
FIG. 9 is a simplified plan view of the shelter of FIG. 8, showing the basic modules in folded condition.

A two room shelter is shown in plan view in FIGS. 8 and 9. It consists of modules 46' and 48', the back wall units of which (54' and 55') are combined into a unitary structure designated generally as 51'. A doorway 56' provides communication between the two rooms of the shelter.

FIG. 9 shows, in simplified form, the shelter of FIG. 8 in its packed or transport condition, with side wall sections 29 folded in accordion fashion against back wall unit 54', and front wall thus drawn closely against back wall unit 54'.

Figure 10:
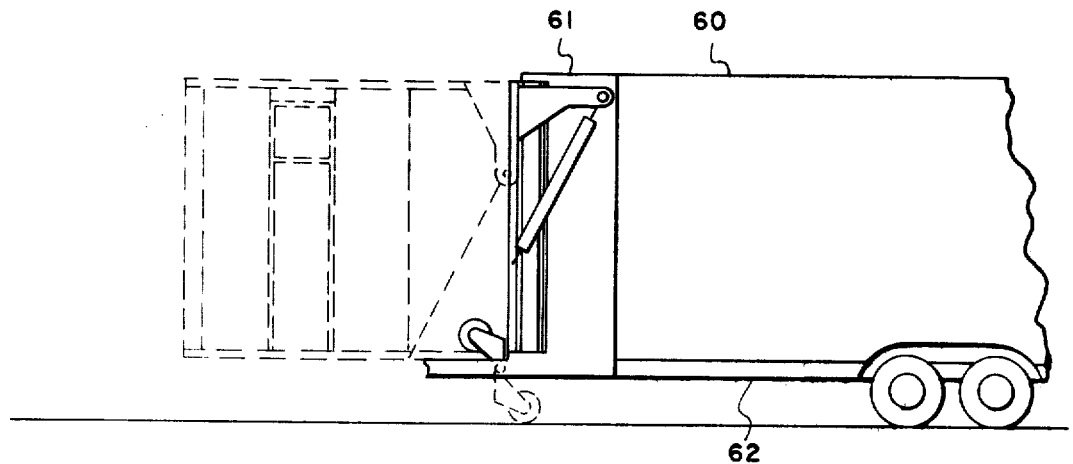
FIG. 10 is a somewhat diagramatic side elevational view of an embodiment of the invention which includes a basic module mounted at the front of a conventional box trailer.
Figure 11:
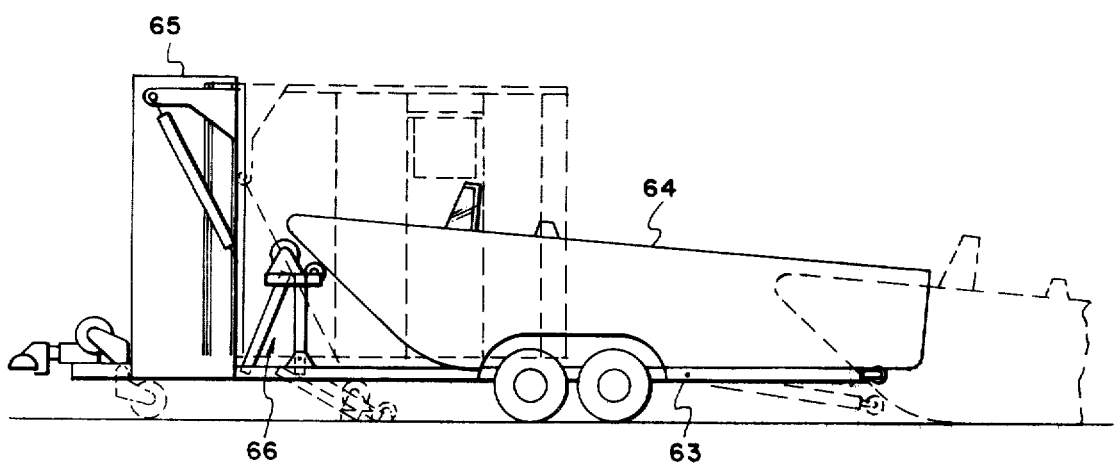
FIG. 11 is a somewhat diagramatic side elevational view of embodiment of the invention including a basic module combined with a trailer designed to accommodate a removable load, the load being illustrated as a small boat.

FIGS. 10 and 11 illustrate in somewhat diagramatic form embodiments of the invention in which the basic module is combined with trailer structures. In FIG. 10 there is illustrated a conventional box trailer 60, which may be a house trailer with living accommodations therein, or a horse trailer, or another type of general or special purpose cargo trailer. A basic module 61 is mounted at the front end of trailer 60 and is oriented on the trailer frame 62 so that it unfolds outwardly to the left, as FIG. 10 is drawn, away from box trailer 60. The unfolded condition of basic module 61 is illustrated in dotted outline in FIG. 10. Suitable jacks (not shown) or other supports may be provided to support the outer end of module 61 in its unfolded configuration. When box trailer 60 is a horse trailer or other type of cargo trailer, the embodiment of the invention in FIG. 10 provides living accommodations in addition to the cargo capacity of the trailer without materially increasing its length. On the other hand, when trailer 60 is a house or travel trailer, the provision of module 61 at the front end of the trailer permits a significant increase in the interior living space of the house trailer, without materially increasing its travel length. When trailer 60 is a house trailer, an internal door or doorway can be provided between basic module 61 and the interior proper of trailer 60. It should also be noted that basic modules such as 61 can be provided at the aft end of a trailer 60 when it is of the house or travel trailer type, or if desired, along one or both sides of the trailer 60. The same advantages just recited, those of increased internal interior living space, without material increase of the travel size of the trailer, are obtained in varying degrees by such arrangements.

FIG. 11 illustrates an embodiment of the invention making use of an open-bed trailer of the kind designed to accommodate a removable load. In the instance of FIG. 11, the trailer is a boat trailer designated as 63, on which a boat 64 is shown positioned, as drawn in full lines. When the boat is launched, as indicated by the dotted outline illustration, the bed of trailer 63 is clear. In accordance with the invention a basic module 65, shown in full lines in its folded position, is mounted at the front end of trailer 63 and is positioned to open rearwardly on to the clear bed of trailer 63, as indicated by the dotted outline showing of module 65. The boat launching gear designated generally as 66 is constructed and arranged to fold downwardly, as indicated in dotted outline on FIG. 9, out of the unfolding path of the module 65. The embodiment shown in FIG. 11 thus provides a trailer with both boat hauling and living accommodations in a travel length not materially greater than that of a boat trailer alone. Since the module 65 is opened out on to the bed of trailer 63, no additional support devices in the nature of jacks, or the like, are needed when module 65 is in its unfolded condition. Module 65 may, if desired, be reversed on trailer 63 so that it will expand to the left in FIG. 11 in a manner similar to that shown in FIG. 10 and discussed previously, to provide living accommodations without necessitating removal of the boat or other removable load.

Figure 12:
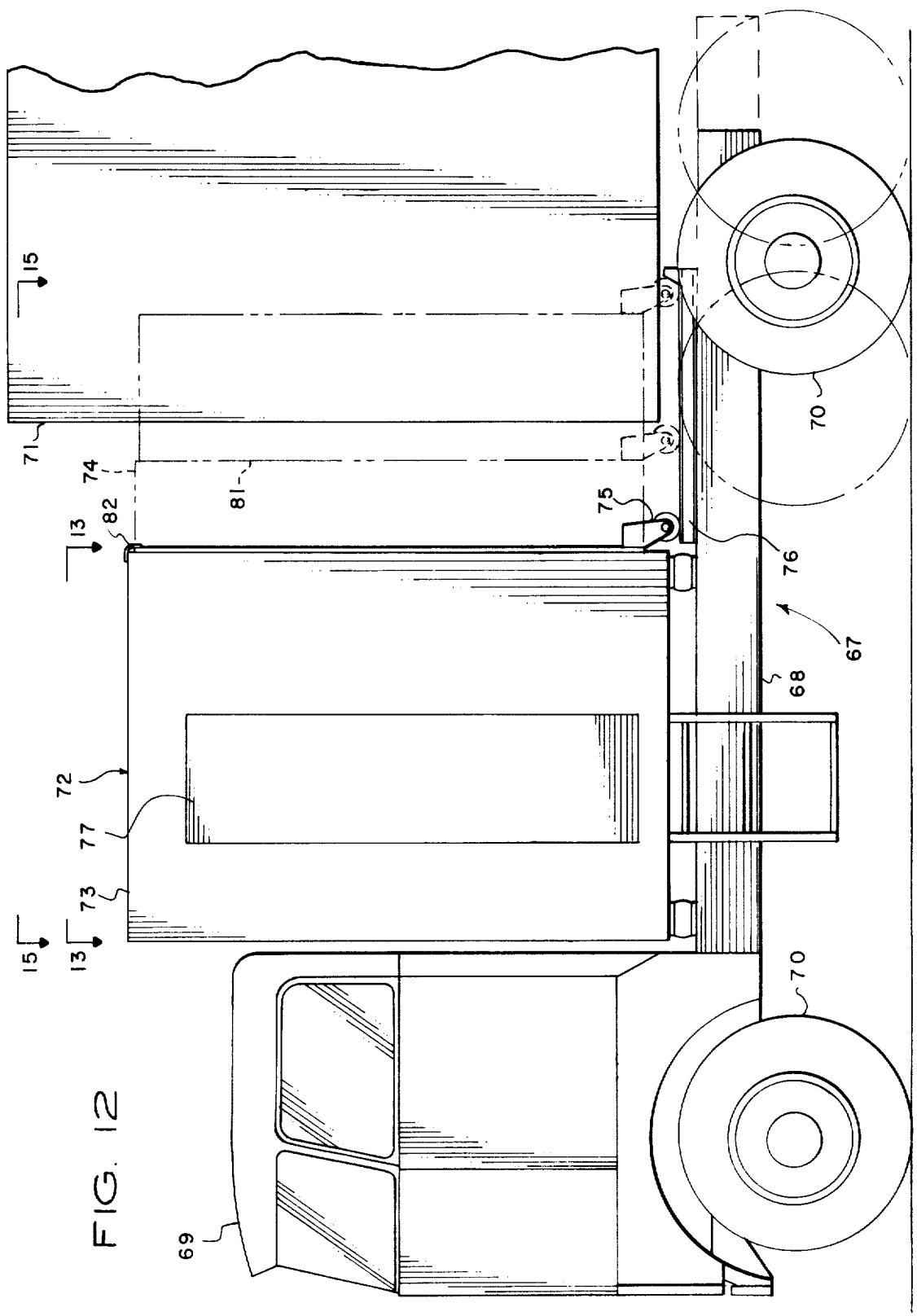
FIG. 12 is a side elevational view, similar to that of FIG. 1, showing a truck tractor equipped with another form of the basic module, which form is of the telescoping type.

FIGS. 12-16 illustrate another embodiment of the invention, utilizing another form of the basic module. In FIG. 12 there is shown an embodiment which includes a conventional truck tractor designated generally as 67, having a frame 68, and over-the-engine cab 69 and wheels 70. Also shown in FIG. 12 is a fragment of a semi-trailer 71, connected by a fifth wheel (which is not shown) to the tractor 67. On the frame 68, behind driver's cab 69, but in front of semi-trailer 71, there is mounted a basic module 72.

Basic module 72 includes a relatively deep back wall unit 73, and as best shown in FIGS. 13-16, the roof, floor, and side and front wall units are, in this embodiment, combined into a single box-like structure 74 which is proportioned to telescope into back wall unit 73 and which is slidably attached to the back wall unit. As shown in FIG. 12 the telescoping structure 74 is desirably provided with supporting casters 75 which ride on rails 76 mounted on frame 68.

Figure 13:
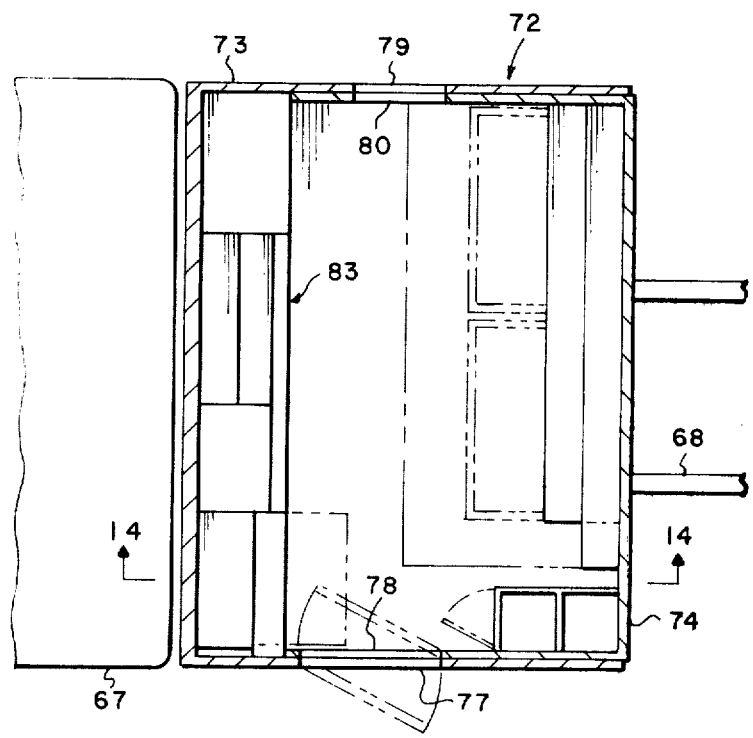
FIG. 13 is a plan view, in section, of the module shown in FIG. 12 in its telescoped condition, showing the internal arrangement of the accommodations in the module.
Figure 14:
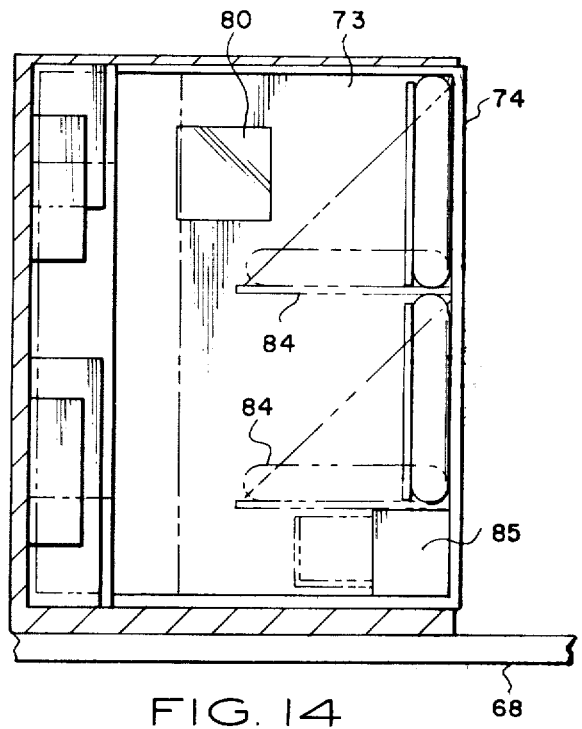
FIG. 14 is a sectional elevational view of the module shown in FIGS. 12 and 13, the section being taken on line 14—14 of FIG. 13.
Figure 15:
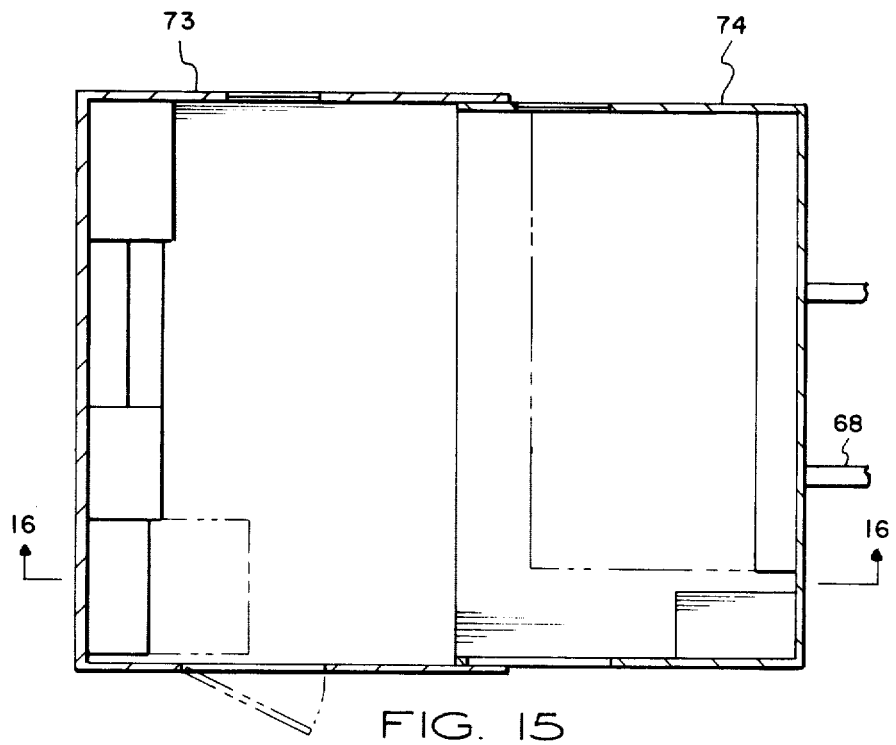
FIG. 15 is a plan view of the module shown in FIG. 12, the view being somewhat similar to FIG. 13, but showing the module in its expanded condition.
Figure 16:
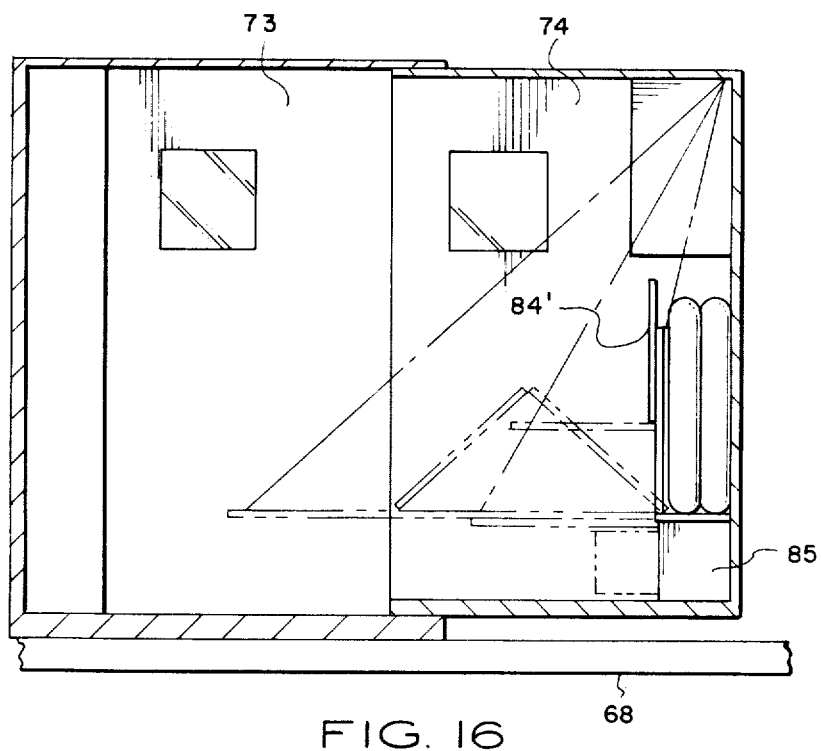
FIG. 16 is a sectional elevational view of the module of FIG. 15 shown in its expanded position, the section being taken on the line 16—16 of FIG. 15.

Both the back wall unit 73 and the telescoping unit 74 are provided with doors, that for the back wall unit 73 being designated as 77, and that for the telescoping unit 74 being designated as 78 (FIG. 13). As can be seen from FIG. 13, when the telescoping unit 74 is fully displaced into the back wall unit 73, the doors 77 and 78 are in registry with one another, and access to the interior of the module can be obtained by opening both of them. Similarly, on the other side of the module, window 79 in the back wall unit is in registry with window 80 in the telescoping unit.

Without detaching the tractor 67 from the semi-trailer 71, the telescoping unit can be displaced outwardly from the back wall unit somewhat as indicated in dotted outline at 81. Such displacement will provide a larger interior living space, but it will also place doors 78 and 77 somewhat out of registry, thereby making access to the interior of the module somewhat less convenient. By separating the tractor from the semi-trailer completely, it is possible to displace the telescoping unit 74 even farther out of the back wall unit 73 to the position indicated in FIGS. 15 and 16. In such position the interior accommodations of the basic module are maximized. A flexible weather seal 82 (in FIG. 12) is provided at the telescoping joint between units 73 and 74.

Within the basic module shown in FIGS. 12-16, there is provided furniture and equipment illustrative of both that which can be included in a basic module of the type designated 72, and in a basic module of the type designated 24 in FIGS. 1-6. In the back wall unit portion of basic module 72, there are provided wall cabinets designated generally as 83, which may include a folding shower, a cook stove, storage drawers, and refrigerator, and the like. In the telescoping unit portion 74 there are provided folding bunks 84, and drawer unit 85. If desired, a folding bunk 84' (see FIG. 16) capable of forming a double bed may be provided.

A basic module of the form illustrated in FIGS. 12-16 may conveniently be constructed of the same materials discussed above in connection with the basic module of FIGS. 1-6. Furthermore, the basic module of the kind illustrated in FIGS. 12-16 may be employed in conjunction with trailers, or in conjunction with other basic modules, either of the same kind, or of the kind illustrated in FIGS. 1-6, to form portable shelter equipment useful in a wide variety of applications.

From the foregoing it can be seen that in accordance with the present invention there is provided improved portable shelter equipment of simple construction, light-weight, easy operation, and great flexibility of arrangement and use in combination with other equipment.

What is claimed is:

1. A foldable and expandable modular shelter unit for a transportation vehicle comprising: a generally rectangular upright backwall unit; means establishing a roof, a floor, sidewalls and a frontwall; means hingedly connecting said roof, floor and sidewalls to said backwall unit for displacing said roof, floor, sidewalls and frontwall away from said backwall unit to form an expanded generally prismatic shelter room and toward said backwall unit to form a compact package; support means for said backwall unit, said support means comprising frame members of the transportation vehicle; means for releasably securing said backwall unit to said support means; linkage means connected at one end to said support means and at an opposite end to a top section of said backwall unit; and expansion means connected to said linkage means for raising said backwall unit upwardly from said support means, outwardly therefrom and downwardly upon a ground surface adjacent to the transportation vehicle.

2. A modular shelter unit in accordance with claim 1 in which said linkage means includes a pair of transverse bars fixedly positioned to the vehicle on opposite sides of said backwall unit in parallel spaced relationship and a pair of levers, each pivotally attached to said transverse bar at one end and pivotally attached to said backwall unit at the opposite end; and said expansion means includes a pair of expansion elements each attached at one end to said transverse bar and at the opposite end to said lever for providing expansion force for imparting pivotal movement to said levers upon said transverse bars and the resultant lifting of said backwall unit from said support means and movement outwardly therefrom for selective positioning upon the adjacent ground surface.

3. A modular shelter unit in accordance with claim 2 in which said expansion means comprises pressure cylinders actuated by pressure fluid; said transverse bars being positioned in longitudinal parallel spaced relationship upon the vehicle, each bar comprising a generally U-shaped configuration with said lever pivotally attached at one end and said expansion means pivotally attached on the other end; and expansion of said pressure cylinder imparting a pivotal movement to said lever producing an arcuate path laterally to, and upwardly and outwardly from, said transportation vehicle.

4. A modular shelter unit in accordance with claim 1 in which said floor section is mounted for swinging movement against and away from said backwall unit outboard of said roof section and further comprising: lever means connected to said roof section in position to apply a swinging moment about its hinge connection to said back wall unit; and bias means connected between said lever means and said floor section at a point thereon outboard of its hinge connection to said back wall unit, thereby providing for tensioning of said bias means upon outward swinging motion of said floor section and for application of a swinging force through said lever means to said roof section by said bias means in the course of relaxation thereof upon outward swinging motion of said section.

5. A foldable and expandable modular shelter unit for a transportation vehicle comprising: a generally rectangular upright backwall unit; a pair of accordian sidewall sections hingedly connected to adjacent vertical edges of said backwall unit; support means for said backwall unit, said support means comprising frame members of the transportation vehicle; means securing said backwall unit to said support means; a frontwall section hingedly connected to a vertical edge of each of said sidewall sections; a roof section hingedly connected to a top edge of said backwall unit; a floor section hingedly connected to a bottom edge of said backwall unit; and latch means for securing said sections to one another upon each being swung outwardly about its hinged connection from said backwall unit to thereby form an expandable generally prismatic shelter room, and for securing said sections against said backwall unit upon each being swung inwardly about its hinge connection to said backwall unit to thereby form a folded compact package; said floor section being mounted for swinging movement against and away from said backwall unit outboard of said roof section; lever means connected to said roof section in position to apply swinging moment about its hinge connection to said backwall unit; and bias means connected between said lever means and said floor section and a point thereon outboard of its hinge connection to said backwall unit, thereby providing for tensioning of said bias means upon outwardly swinging motion of said floor section and for application of a swinging force through said lever means to said roof section by said bias means in the course of relaxation thereof upon outward swinging motion of said roof section.

6. A modular shelter unit in accordance with claim 5 in which said roof section, floor section, accordion sidewalls and frontwall section are displacable away from said transportation vehicle frame members to form said expanded generally prismatic shelter room.

* * * * *